(12) United States Patent
Matsuda et al.

(10) Patent No.: US 11,306,230 B2
(45) Date of Patent: Apr. 19, 2022

(54) ULTRAVIOLET CURABLE SILICONE ADHESIVE COMPOSITION AND SILICONE ADHESIVE FILM

(71) Applicant: SHIN-ETSU CHEMICAL CO., LTD., Tokyo (JP)

(72) Inventors: Tsuyoshi Matsuda, Annaka (JP); Ken Nakayama, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 259 days.

(21) Appl. No.: 16/619,429

(22) PCT Filed: Jun. 12, 2018

(86) PCT No.: PCT/JP2018/022407
§ 371 (c)(1),
(2) Date: Dec. 4, 2019

(87) PCT Pub. No.: WO2019/009026
PCT Pub. Date: Jan. 10, 2019

(65) Prior Publication Data
US 2020/0172778 A1    Jun. 4, 2020

(30) Foreign Application Priority Data

Jul. 5, 2017  (JP) .............................. JP2017-131829

(51) Int. Cl.
*C09J 183/04*    (2006.01)
*C09J 7/25*      (2018.01)
(Continued)

(52) U.S. Cl.
CPC ............. *C09J 183/04* (2013.01); *B32B 27/00* (2013.01); *C08F 290/06* (2013.01); *C08G 77/18* (2013.01);
(Continued)

(58) Field of Classification Search
CPC ..... C09J 183/04; C09J 7/25; C09J 7/38; C09J 183/06; C09J 183/10; C09J 2203/318;
(Continued)

(56) References Cited

U.S. PATENT DOCUMENTS 6,069,186 A    5/2000  Okinoshima et al.
2003/0064232 A1*  4/2003  Allen .................. C08L 83/06
                                                        428/447
(Continued)

FOREIGN PATENT DOCUMENTS

JP         2631098 B2    7/1997
JP         11-302348 A   11/1999
(Continued)

OTHER PUBLICATIONS

International Search Report for PCT/JP2018/022407 (PCT/ISA/210) dated Sep. 11, 2018.
(Continued)

*Primary Examiner* — Michael B Nelson
(74) *Attorney, Agent, or Firm* — Birch, Stewart, Kolasch & Birch, LLP

(57) ABSTRACT

This ultraviolet curable silicone adhesive composition that contains
(A) an organopolysiloxane resin which contains (a) an $R^1_3SiO_{1/2}$ unit (wherein $R^1$ represents a monovalent hydrocarbon group) and (b) an $SiO_{4/2}$ unit, and wherein the molar ratio of the unit (a) to the unit (b) is from 0.6:1 to 1.2:1,
(B) a linear or branched organopolysiloxane which has a viscosity of more than 50 mPa·s but 500,000 mPa·s or less, while having 1-4 groups represented by formula (1) and/or (2)

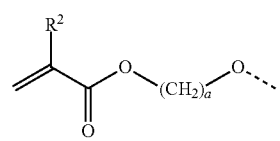

(wherein $R^2$ represents H or Me, a represents a number of 1-3, and the broken line represents a bonding hand that is bonded with Si)
as Si-bonded groups, and wherein the main chain is composed of repeated diorganosiloxane units, and
(C) a reactive diluent which is composed of an organo (poly)siloxane that has a viscosity of 1-50 mPa·s, while having one group represented by formula (3)

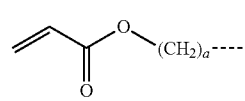

(wherein a is as defined above, and the broken line represents a bonding hand)
at an end of the molecular chain or in a molecular side chain as an Si-bonded group, is rapidly cured by means of irradiation of ultraviolet light, and exhibits good adhesion to a sheet-like substrate.

8 Claims, No Drawings

(51) Int. Cl.

| | |
|---|---|
| *C09J 7/38* | (2018.01) |
| *C08K 5/5425* | (2006.01) |
| *C08K 5/5415* | (2006.01) |
| *C09J 183/06* | (2006.01) |
| *C08K 5/14* | (2006.01) |
| *C09J 183/10* | (2006.01) |
| *C08G 77/18* | (2006.01) |
| *C09D 183/06* | (2006.01) |
| *C08L 83/06* | (2006.01) |
| *C08F 290/06* | (2006.01) |
| *C08G 77/00* | (2006.01) |
| *C08G 77/20* | (2006.01) |
| *B32B 27/00* | (2006.01) |

(52) U.S. Cl.
CPC .............. *C08G 77/20* (2013.01); *C08G 77/70* (2013.01); *C08G 77/80* (2013.01); *C08K 5/14* (2013.01); *C08K 5/5415* (2013.01); *C08K 5/5425* (2013.01); *C08L 83/06* (2013.01); *C09D 183/06* (2013.01); *C09J 7/25* (2018.01); *C09J 7/38* (2018.01); *C09J 183/06* (2013.01); *C09J 183/10* (2013.01); *C09J 2203/318* (2013.01); *C09J 2203/326* (2013.01); *C09J 2301/416* (2020.08); *C09J 2483/00* (2013.01)

(58) Field of Classification Search
CPC ............ C09J 2203/326; C09J 2301/416; C09J 2483/00; C09J 7/22; C09J 11/06; C09J 2301/312; B32B 27/00; C08F 290/06; C08G 77/18; C08G 77/20; C08G 77/70; C08G 77/80; C08K 5/14; C08K 5/5415; C08K 5/5425; C08L 83/06; C09D 183/06

See application file for complete search history.

(56) References Cited

U.S. PATENT DOCUMENTS

| | | |
|---|---|---|
| 2003/0190484 A1 | 10/2003 | Kashiwagi et al. |
| 2007/0202245 A1 | 8/2007 | Gantner et al. |
| 2010/0038023 A1 | 2/2010 | Kho et al. |
| 2012/0040180 A1 | 2/2012 | Husemann et al. |
| 2015/0124338 A1 | 5/2015 | Mayumi et al. |

FOREIGN PATENT DOCUMENTS

| | | | |
|---|---|---|---|
| JP | 2003-238809 | A | 8/2003 |
| JP | 2006-104296 | A | 4/2006 |
| JP | 2007-191637 | A | 8/2007 |
| JP | 2007-532179 | A | 11/2007 |
| JP | 2009-530470 | A | 8/2009 |
| JP | 2009-242786 | A | 10/2009 |
| JP | 2012-519227 | A | 8/2012 |
| JP | 2015-110752 | A | 6/2015 |
| JP | 2015-214637 | A | 12/2015 |
| JP | 5825738 | B2 | 12/2015 |
| JP | 5989417 | B2 | 9/2016 |

OTHER PUBLICATIONS

Written Opinion of the International Searching Authority for PCT/JP2018/022407 (PCT/ISA/237) dated Sep. 11, 2018.

* cited by examiner

ULTRAVIOLET CURABLE SILICONE ADHESIVE COMPOSITION AND SILICONE ADHESIVE FILM

TECHNICAL FIELD

This invention relates to an ultraviolet (UV) cure type silicone pressure-sensitive adhesive (PSA) composition and a silicone pressure-sensitive adhesive film, suited for use in image display units.

BACKGROUND ART

As symbolized by mobile electronic instruments such as smart phones and tablet terminals, touch panel instruments including both a display unit and an input means become rapidly widespread nowadays. The touch panel instruments are constructed by optical members, which include liquid crystal display panels and complex polarizers such as polarizing plates and phase difference plates. These optical members are bonded together via an optical clear pressure-sensitive adhesive (PSA).

The optical clear PSAs are generally divided into OCA (optical clear adhesive) or carrier-less PSA tape and OCR (optical clear resin) or liquid reactive resin, each of which mainly includes heat cure type and UV cure type. Of these, the UV cure type PSAs are nowadays widely used in the manufacture of optical products because of containment of no solvent media such as solvents and water, possible formation of a PSA layer without removal of solvent media, and no need for heating.

As the OCA and OCR materials of UV cure type, a number of acrylic PSAs were proposed (Patent Document 1: JP-A 2006-104296 and Patent Document 2: JP-A 2009-242786).

However, since these acrylic PSAs undergo noticeable shrinkage upon curing, liquid crystal display panels, for example, can be deformed by the internal stresses associated therewith. This is the outstanding problem in the modern age when panels have advanced to the stage of high luminance, high definition and large size.

As compared with silicone PSAs, the acrylic PSAs undergo noticeable transparency loss and yellowing at high temperatures and a substantial variation of modulus with temperature changes. There is left the problem that the acrylic PSAs tend to peel from liquid crystal display panels, polarizers and the like.

As for the silicone PSAs, especially of solventless type, most silicone PSAs proposed thus far are of heat cure type as described in Patent Document 3: JP 5825738 and Patent Document 4: JP 2631098 whereas only a few are of UV cure type. Patent Document 5: JP 5989417 proposes a UV cure type silicone resin composition comprising a combination of linear and branched organopolysiloxanes having specific (meth)acryloxy groups while its adhesion to plastic films used in displays, typically polycarbonate (PC) and polymethyl methacrylate (PMMA) is evaluated nowhere.

PRIOR ART DOCUMENTS

Patent Documents

Patent Document 1: JP-A 2006-104296
Patent Document 2: JP-A 2009-242786
Patent Document 3: JP 5825738
Patent Document 4: JP 2631098
Patent Document 5: JP 5989417

SUMMARY OF INVENTION

Technical Problem

An object of the invention, which has been made under the above-mentioned circumstances, is to provide a UV-curable silicone PSA composition which fast cures upon UV exposure and has satisfactory adhesion to sheet-like substrates, typically plastic films, and a silicone PSA film.

Solution to Problem

Making extensive investigations to attain the above object, the inventors have found that a UV-curable silicone PSA composition is obtained by using an organopolysiloxane resin comprising essentially $R^1{}_3SiO_{1/2}$ units (wherein $R^1$ is a substituted or unsubstituted $C_1$-$C_{10}$ monovalent hydrocarbon group) and $SiO_{4/2}$ units, in admixture with an organopolysiloxane containing on the average 1 to 4 specific (meth)acryloxy groups per molecule and having a specific viscosity and a reactive diluent in the form of a low molecular weight or low viscosity organopolysiloxane containing one acryloxyalkyl group having the general formula (3), defined below, per molecule, in a specific blend ratio, the resulting silicone PSA composition being fast curable upon UV exposure and having satisfactory adhesion to sheet-like substrates, typically plastic films. The invention is predicated on this finding.

The invention provides a UV-curable silicone PSA composition and a silicone PSA film as defined below.

[1] A UV-curable silicone pressure-sensitive adhesive composition comprising (A) 30 to 70 parts by weight of an organopolysiloxane resin comprising essentially (a) $R^1{}_3SiO_{1/2}$ units wherein $R^1$ is a substituted or unsubstituted $C_1$-$C_{10}$ monovalent hydrocarbon group and (b) $SiO_{4/2}$ units, wherein a molar ratio of units (a) to units (b) is from 0.6:1 to 1.2:1, (B) 1 to 40 parts by weight of a linear or branched organopolysiloxane having a backbone composed of repeating diorganosiloxane units and containing per molecule 1 to 4 groups on the average, the groups having the general formula (1) and/or (2):

[Chem.1]

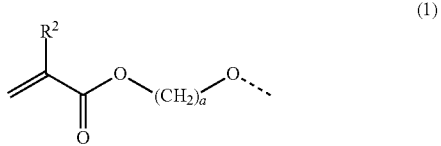

(1)

wherein $R^2$ is hydrogen or methyl, a is an integer of 1 to 3, and the broken line designates a valence bond bonded to silicon atom,

[Chem. 2]

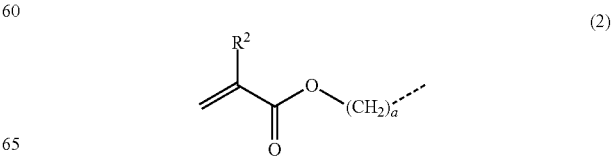

(2)

wherein $R^2$ and a are as defined above, and the broken line designates a valence bond bonded to silicon atom, as the silicon-bonded monovalent substituent group in the molecule, the organopolysiloxane having a viscosity at 25° C. of from more than 50 mPa·s to 500,000 mPa·s, and (C) 1 to 40 parts by weight of a reactive diluent in the form of an organo(poly)siloxane containing one group having the general formula (3):

[Chem. 3]

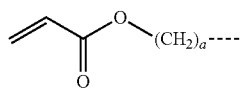

(3)

wherein a is as defined above and the broken line designates a valence bond, at an end or on a side chain of the molecular chain as the silicon-bonded monovalent substituent group in the molecule, the organo(poly)siloxane having a viscosity at 25° C. of 1 to 50 mPa·s, with the proviso that the total of components (A) to (C) is 100 parts by weight.

[2] The silicone PSA composition of [1] wherein component (B) contains at both ends of the molecular chain groups having the general formula (4) and/or (5):

[Chem.4]

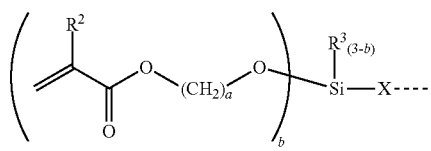

(4)

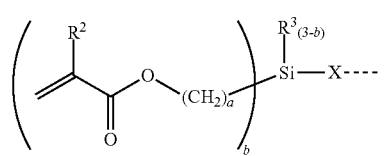

(5)

wherein $R^2$ is hydrogen or methyl, $R^3$ is independently a substituted or unsubstituted $C_1$-$C_{10}$ monovalent hydrocarbon group, X is a $C_2$-$C_6$ alkylene group, a is an integer of 1 to 3, b is 1 or 2, and the broken line designates a valence bond bonded with silicon atom.

[$^3$] The silicone PSA composition of [1] or [2] wherein the backbone of component (B) consists of repeating diorganosiloxane units each containing a diphenylsiloxane unit having the general formula (6):

[Chem. 5]

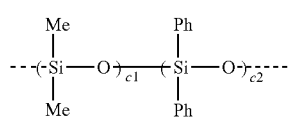

(6)

wherein Me is methyl, Ph is phenyl, c1 and c2 are integers in the range: c1≥0, c2≥1, and c1+c2=c, c is such a number that the organopolysiloxane may have a viscosity at 25° C. of from more than 50 mPa·s to 500,000 mPa·s, and the broken line designates a valence bond.

[4] The silicone PSA composition of any one of [1] to [3] wherein component (C) is an organo(poly)siloxane having the general formula (7) or (8):

[Chem.6]

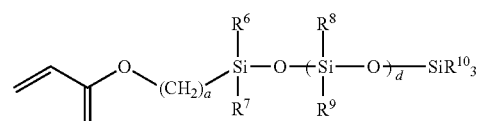

(7)

[Chem.7]

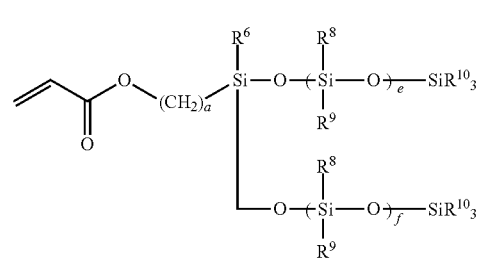

(8)

wherein $R^6$ to $R^{10}$ each are a substituted or unsubstituted $C_1$-$C_{12}$ monovalent hydrocarbon group, a is an integer of 1 to 3, d to f are such numbers that the organo(poly)siloxane may have a viscosity at 25° C. of 1 to 50 mPa·s, d is an integer of 0 to 3, e and f are 0 or 1.

[5] The silicone PSA composition of any one of [1] to [4], further comprising (D) 0.01 to 15 parts by weight of a photo-initiator per 100 parts by weight of components (A) to (C) combined.

[6] The silicone PSA composition of any one of [1] to [5] which forms a silicone pressure-sensitive adhesive having a storage elastic modulus of up to 1.0 MPa after curing.

[7] A silicone PSA film comprising a substrate and a PSA layer formed on at least one surface of the substrate from silicone PSA, said PSA layer being a UV-cured product of the silicone PSA composition of any one of [1] to [6].

[8] The silicone PSA film of [7] wherein the substrate is a plastic film.

Advantageous Effects of Invention

The UV-curable silicone PSA composition of the invention is effectively curable even in a small dose of UV exposure and fully bondable to plastic films such as polyester films. Since the UV-curable silicone PSA composition not only has excellent resistance to oxygen inhibition upon UV exposure, but is also a low viscosity composition despite the solventless type, the composition is significantly improved in workability over prior art silicone base PSA compositions.

DESCRIPTION OF EMBODIMENTS

Now the invention is described in detail.
The invention provides a UV-curable silicone PSA composition comprising
(A) an organopolysiloxane resin comprising essentially (a) $R^1_3SiO_{1/2}$ units wherein $R^1$ is a substituted or unsubstituted $C_1$-$C_{10}$ monovalent hydrocarbon group and (b) $SiO_{4/2}$ units, wherein a molar ratio of units (a) to units (b) is from 0.6:1 to 1.2:1, (B) a linear or branched organopolysiloxane having a backbone composed of repeating diorganosiloxane units and containing per molecule 1 to 4 groups on the average, the groups having the general formula (1) and/or (2):

[Chem.8]

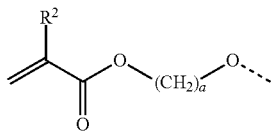

(1)

wherein $R^2$ is hydrogen or methyl, a is an integer of 1 to 3, and the broken line designates a valence bond bonded to silicon atom,

[Chem. 9]

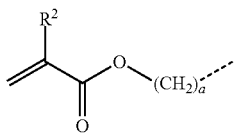

(2)

wherein $R^2$ and a are as defined above, and the broken line designates a valence bond bonded to silicon atom, as the silicon-bonded monovalent substituent group in the molecule, the organopolysiloxane having a viscosity at 25° C. of from more than 50 mPa·s to 500,000 mPa·s, (C) a reactive diluent in the form of an organo(poly) siloxane containing one group having the general formula (3):

[Chem. 10]

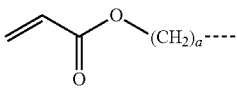

(3)

wherein a is as defined above and the broken line designates a valence bond, at an end or on a side chain of the molecular chain as the silicon-bonded monovalent substituent group in the molecule, the organo(poly)siloxane having a viscosity at 25° C. of 1 to 50 mPa·s, and preferably (D) a photo-initiator.

[Component (A)]

Component (A), which serves to provide a bonding force to sheet-like substrates, is an organopolysiloxane resin or silicone resin of three-dimensional network structure comprising essentially (a) $R^1{}_3SiO_{1/2}$ units wherein $R^1$ is a substituted or unsubstituted $C_1$-$C_{10}$ monovalent hydrocarbon group and (b) $SiO_{4/2}$ units, wherein a molar ratio of units (a) to units (b) is in the range between 0.6:1 and 1.2:1.

Examples of the $C_1$-$C_{10}$ monovalent hydrocarbon group $R^1$ include alkyl groups, preferably of 2 to 6 carbon atoms, such as methyl, ethyl, propyl, isopropyl, butyl, isobutyl, sec-butyl, and tert-butyl, alkenyl groups, preferably of 2 to 6 carbon atoms, such as vinyl, allyl, propenyl, isopropenyl, and butenyl, aryl groups, preferably of 6 to 10 carbon atoms, such as phenyl and tolyl, aralkyl groups, preferably of 7 to 10 carbon atoms, such as benzyl, and halo- or cyano-substituted monovalent hydrocarbon groups in which some or all of the carbon-bonded hydrogen atoms are substituted by halogen atoms, such as chloromethyl, bromoethyl and trifluoropropyl, or by cyano groups, such as cyanoethyl.

In component (A), the molar ratio of (a) $R^1{}_3SiO_{1/2}$ units (M units) to (b) $SiO_{4/2}$ units (Q units), i.e., the molar ratio (a)/(b) is in the range between 0.6/1 and 1.2/1, preferably between 0.7/1 and 1.2/1. If the molar ratio is less than 0.6, then the cured composition (silicone resin) may lose bonding force and tackiness. If the molar ratio exceeds 1.2, there may be losses of bonding force and holding force.

Notably, the organopolysiloxane resin may further contain $R^1SiO_{3/2}$ units (T units) and/or $R^1{}_2SiO_{2/2}$ units (D units) in a total amount of 0 to 30 mol %, especially 0 to 20 mol % based on the total of all siloxane units (i.e., total of M, D, T and Q units) in the molecule as long as the benefits of the organopolysiloxane resin are not impaired.

The organopolysiloxane resin has a hydroxysilyl (or silanol) group content which is preferably 0.01 to 0.1 mol/100 g.

The organopolysiloxane resin defined above is a well-known material in the art, which is obtainable from cohydrolytic condensation of a hydrolyzable triorganosilane (e.g., triorganoalkoxysilane or triorganochlorosilane), a $R^1$-free hydrolyzable silane or siloxane (e.g., tetraalkoxysilane, tetrachlorosilane, ethyl silicate or methyl silicate), and optionally a hydrolyzable diorganosilane and/or monoorganosilane (e.g., diorganodialkoxysilane, diorganodichlorosilane, organotrialkoxysilane or organotrichlorosilane).

It is noted that component (A) may be used in dilute form in a solvent such as toluene, xylene or heptane when the inventive composition is prepared by uniformly mixing component (A) with components (B) and (C) and optionally (D). After the composition is prepared, the solvent is eventually removed by such means as stripping and the composition is used in solventless form.

Preferably component (A) has a viscosity at 25° C. of 1 to 50 mPa·s, more preferably 3 to 30 mPa·s, as measured in 60 wt % toluene solution. As used herein, the viscosity is measured by a rotational viscometer, e.g., BL, BH, BS, cone plate type or rheometer (the same holds true, hereinafter).

The amount (calculated as solids) of component (A) blended is 30 to 70% by weight, preferably 40 to 70% by weight, more preferably 50 to 65% by weight based on the total weight of components (A) to (C) (inclusive of components (B) and (C) to be described later), specifically 30 to 70 parts by weight, preferably 40 to 70 parts by weight, more preferably 50 to 65 parts by weight per 100 parts by weight of components (A) to (C) combined. If the amount of component (A) is too much, losses of bonding force and tack may occur due to agglomeration of the organopolysiloxane resin. If the amount of component (A) is too small, bonding force or tack may not be developed.

[Component (B)]

Component (B) used herein is a base polymer constituting the main skeleton of a siloxane matrix which is formed as a result of crosslinking or curing of the inventive composition, or a UV-curable component which crosslinks upon UV exposure, and specifically, a linear or branched organopolysiloxane having a backbone composed substantially of repeating diorganosiloxane units and containing 1 to 4 groups, preferably 2 to 4 groups, more preferably 4 groups on the average, the groups having the general formula (1) and/or (2):

[Chem.11]

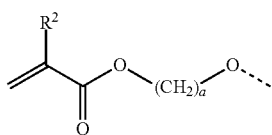
(1)

wherein R² is hydrogen or methyl, a is an integer of 1 to 3, and the broken line designates a valence bond bonded to silicon atom,

[Chem. 12]

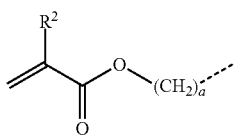
(2)

wherein R² and a are as defined above, and the broken line designates a valence bond bonded to silicon atom, in the molecule (preferably at both molecular chain ends, more preferably only at both molecular chain ends), as the silicon-bonded monovalent substituent group in the molecule (preferably as the monovalent substituent group bonded to the silicon atom at the molecular chain end, more preferably as the monovalent substituent group bonded to only the silicon atom at the molecular chain end), the organopolysiloxane having a viscosity at 25° C. of more than 50 mPa·s to 500,000 mPa·s, preferably 100 to 300,000 mPa·s, more preferably 300 to 100,000 mPa·s.

In formula (1) or (2), a is 1, 2 or 3, preferably 2 or 3.

The position in the organopolysiloxane molecule of component (B) at which the group of formula (1) or (2) is attached may be the end of the molecular chain or a non-terminal position of the molecular chain (i.e., a midway position or side chain of the molecular chain), or both. Preferably the group of formula (1) or (2) is attached at both ends of the molecular chain, more preferably only at both ends of the molecular chain.

In particular, groups of the general formula (4) and/or (5) are preferably attached at both ends of the molecular chain.

[Chem.13]

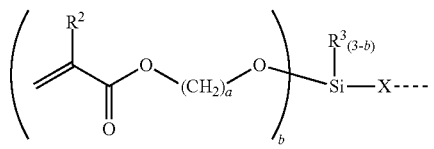
(4)

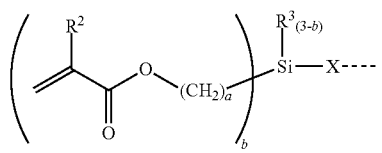
(5)

Herein R² and a are as defined above. R³ is independently a substituted or unsubstituted $C_1$-$C_{10}$ monovalent hydrocarbon group. X is a $C_2$-$C_6$ alkylene group, and b is 1 or 2. The broken line designates a valence bond bonded to silicon atom.

In formulae (4) and (5), R³ is independently a substituted or unsubstituted $C_1$-$C_{10}$, preferably $C_1$-$C_8$ monovalent hydrocarbon group, preferably exclusive of an aliphatic unsaturated group such as alkenyl group. Examples of the unsubstituted monovalent hydrocarbon group include alkyl groups such as methyl, ethyl, propyl, isopropyl, butyl, isobutyl, tert-butyl, hexyl, cyclohexyl, octyl, 2-ethylhexyl and decyl; alkenyl groups such as vinyl, allyl, propenyl, isopropenyl, and butenyl; aryl groups such as phenyl, tolyl, xylyl, and naphthyl; and aralkyl groups such as benzyl, phenylethyl and phenylpropyl. Examples of the substituted monovalent hydrocarbon group include halo or cyano-substituted monovalent hydrocarbon groups in which some or all carbon-bonded hydrogen atoms are substituted by halogen, such as chloromethyl, bromoethyl, and trifluoropropyl, or by cyano moiety, such as cyanoethyl. Inter alia, R³ is preferably an alkyl group, aryl group or haloalkyl group, more preferably methyl, phenyl or trifluoropropyl.

X is a $C_2$-$C_6$ alkylene group, for example, ethylene, propylene (trimethylene or methylethylene), butylene (tetramethylene or methylpropylene), or hexamethylene.

The organopolysiloxane molecule of component (B) contains a silicon-bonded organic group other than the group of the general formula (1) or (2) (or the general formula (4) or (5)), examples of which include substituted or unsubstituted $C_1$-$C_{12}$, preferably $C_1$-$C_{10}$ monovalent hydrocarbon groups, preferably exclusive of aliphatic unsaturated groups such as alkenyl groups, like the above-exemplified R³. Examples of the substituted or unsubstituted monovalent hydrocarbon group include alkyl groups such as methyl, ethyl, propyl, isopropyl, butyl, isobutyl, tert-butyl, pentyl, hexyl, heptyl, octyl, 2-ethylhexyl and decyl; cycloalkyl groups such as cyclohexyl; alkenyl groups such as vinyl, allyl, propenyl, isopropenyl, and butenyl; aryl groups such as phenyl, tolyl, xylyl, and naphthyl; aralkyl groups such as benzyl, phenethyl and phenylpropyl; and substituted forms of these monovalent hydrocarbon groups in which some or all hydrogen atoms are substituted by halogen (e.g., chloro, fluoro or bromo), typically haloalkyl groups such as chloromethyl, bromoethyl, 3-chloropropyl, and 3,3,3-trifluoropropyl, or by cyano moiety, such as cyanoethyl. For ease of synthesis, the silicon-bonded organic group is preferably an alkyl group, aryl group or haloalkyl group, more preferably methyl, phenyl or trifluoropropyl.

Also, the molecular structure of component (B) is basically a linear or branched backbone (inclusive of generally linear backbone which is partially branched) composed of repeating diorganosiloxane units. Preferably component (B) is a linear diorganopolysiloxane which is blocked with groups of the general formula (1) or (2) at both ends of the molecular chain. Component (B) may be a single polymer of such molecular structure, a copolymer having such molecular structures, or a mixture of two or more polymers.

Component (B) has a viscosity at 25° C. of from more than 50 mPa·s to 500,000 mPa·s, preferably from 100 to 300,000 mPa·s, more preferably from 300 to 100,000 mPa·s, because the composition is effectively workable and the cured composition has improved dynamic properties.

The above range of viscosity generally corresponds to a number average degree of polymerization of about 50 to 2,000, preferably about 100 to 1,100 in the case of a linear organopolysiloxane. In the disclosure, the degree of polymerization or molecular weight may be measured as number average degree of polymerization or molecular weight, for example, by gel permeation chromatography (GPC) using toluene as developing solvent versus polystyrene standards (the same holds true, hereinafter).

Examples of component (B) defined above include compounds having the general formula (9).

[Chem. 14]

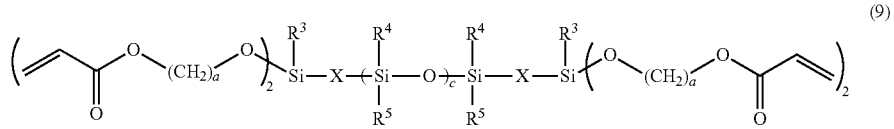

(9)

Herein $R^3$, X and a are as defined above. $R^4$ and $R^5$ are each independently a substituted or unsubstituted $C_1$-$C_{12}$, preferably $C_1$-$C_{10}$ monovalent hydrocarbon groups, preferably exclusive of an aliphatic unsaturated group, and c is such a number that the organopolysiloxane may have a viscosity in the above range, preferably an integer of 11 to 2,000, more preferably 20 to 1,000, even more preferably 30 to 800.

In formula (9), examples of $R^4$ and $R^5$ are as exemplified above for the silicon-bonded organic group. Inter alia, $R^4$ and $R^5$ are preferably alkyl, cycloalkyl, aryl, aralkyl or haloalkyl groups, more preferably methyl, phenyl or trifluoropropyl.

Also in formula (9), —(SiR$^4$R$^5$—O)$_c$— preferably contains a diphenylsiloxane unit having the formula (6).

[Chem. 15]

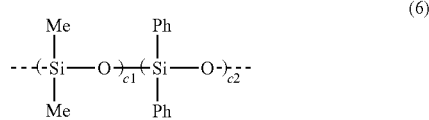

(6)

Herein Me stands for methyl, Ph stands for phenyl, c1 and c2 are integers in the range: c1≥0, C2≥1 and c1+c2=c, preferably c2/c is 0.02 to 1.0, more preferably 0.05 to 0.3, the broken line designates a valence bond.

Exemplary of component (B) are compounds having the following formula.

[Chem. 16]

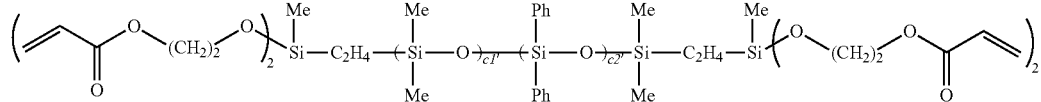

Herein Me stands for methyl, Ph stands for phenyl, c1' and c2' are the same as c1 and c2, respectively, the repetition numbers of dimethylsiloxane units and diphenylsiloxane units in the formula are arbitrary integers selected in the range from 0 to a positive value such that the organopolysiloxane may have a viscosity at 25° C. of 100 to 500,000 mPa·s, especially 300 to 100,000 mPa·s. The arrangement of repeating units in the backbone is random.

The amount of component (B) blended is 1 to 40% by weight, preferably 5 to 30% by weight, more preferably 10 to 30% by weight based on the total weight of components (A) to (C) (inclusive of component (C) to be described later), specifically 1 to 40 parts by weight, preferably 5 to 30 parts by weight, more preferably 10 to 30 parts by weight per 100 parts by weight of components (A) to (C) combined. When the amount of component (B) is not more than 40% by weight, the desired properties, typically flexibility, of a cured product resulting from curing of the inventive composition are readily achieved or adjusted. If the amount of component (B) is too small, the cured product may not be endowed with sufficient elasticity and hence, with desired bonding force or tack.

[Component (C)]

Component (C) used herein serves as a reactive diluent in the inventive composition and is an organo(poly)siloxane containing one group (acryloxyalkyl group) having the general formula (3) at an end or on a side chain of the molecular chain (preferably only one end of the molecular chain) as the silicon-bonded monovalent substituent group in the molecule (preferably as the monovalent substituent group bonded to only the silicon atom at one end of the molecular chain), the organo(poly)siloxane having a relatively low molecular weight (low degree of polymerization or low viscosity) as compared with component (B) and specifically a viscosity at 25° C. of 1 to 50 mPa·s. When the composition contains a specific proportion of component (C), component (C) functions as a curing sensitizer capable of sensitizing the curing reaction utilizing radical polymerization for thereby improving oxygen inhibition resistance in the step of curing the composition by UV exposure. Component (C) also enables to reduce the viscosity of the composition and to control the cured storage modulus to a relatively low value.

[Chem. 17]

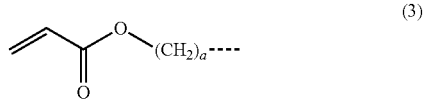

(3)

Herein a is as defined above and the broken line designates a valence bond.

The molecular structure of component (C) is basically a linear structure having a backbone composed of repeating diorganosiloxane units. Component (C) is preferably a linear diorgano(poly)siloxane which is blocked at an end of the molecular chain or side chain with a group having the general formula (3) (preferably blocked at one end of the molecular chain with a group having the general formula (3) and at the other end of the molecular chain with a triorganosilyl group). Component (C) may be a single polymer of such molecular structure or a mixture of two or more polymers.

The group having the general formula (3) is typically contained in the molecule in either of the bonds: the direct bond to silicon atom at an end or non-terminal position in the diorganopolysiloxane unit of which the backbone is composed (i.e., $CH_2=CH-C(=O)-O-(CH_2)_a-Si-$), and the bond to said silicon atom via an ethereal oxygen atom (i.e., $CH_2=CH-C(=O)-O-(CH_2)_a-O-Si-$). In particular, the group having the general formula (3) is preferably in direct bond to the silicon atom. Also preferably, the diorgano(poly)siloxane as component (C) is free of a hydrolyzable functional group such as alkoxy group in the molecule.

Component (C) has a viscosity at 25° C. of 1 mPa·s to 50 mPa·s, preferably 1 to 30 mPa·s, more preferably 2 to 10 mPa·s, because the function of a cure sensitizer becomes stronger at a lower viscosity or a lower molecular weight. The organo(poly)siloxane as component (C) has a number average degree of polymerization (or number of silicon atoms per molecule), which is as low as desirably about 2 to about 10, more desirably about 2 to about 6.

The organo(poly)siloxane molecule of component (C) contains a silicon-bonded organic group other than the group of the general formula (3), examples of which include substituted or unsubstituted $C_1$-$C_{12}$, preferably $C_1$-$C_{10}$ monovalent hydrocarbon groups, preferably exclusive of aliphatic unsaturated groups such as alkenyl groups. Examples of the substituted or unsubstituted monovalent hydrocarbon group include alkyl groups such as methyl, ethyl, propyl, isopropyl, butyl, isobutyl, tert-butyl, pentyl, hexyl, heptyl, octyl, 2-ethylhexyl and decyl; cycloalkyl groups such as cyclohexyl; alkenyl groups such as vinyl, allyl, propenyl, isopropenyl, and butenyl; aryl groups such as phenyl, tolyl, xylyl, and naphthyl; aralkyl groups such as benzyl, phenethyl and phenylpropyl; and substituted forms of these monovalent hydrocarbon groups in which some or all hydrogen atoms are substituted by halogen (e.g., chloro, fluoro or bromo), typically haloalkyl groups such as chloromethyl, bromoethyl, 3-chloropropyl, and 3,3,3-trifluoropropyl, or by cyano moiety, such as cyanoethyl. For ease of synthesis, the silicon-bonded organic group is preferably an alkyl group, aryl group or haloalkyl group, more preferably methyl, phenyl or trifluoropropyl. Especially an organic group providing high compatibility with component (B) is preferably used.

Exemplary of component (C) are compounds having the general formulae (7) and (8).

[Chem. 18]

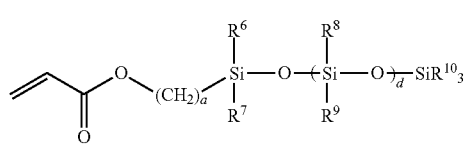
(7)

[Chem. 19]

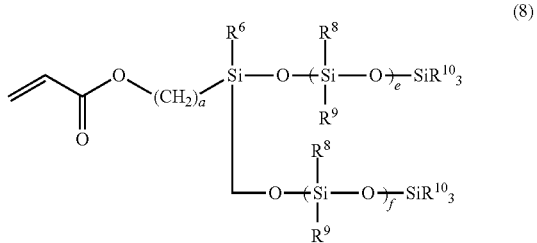
(8)

Herein $R^6$ to $R^{16}$ each are a substituted or unsubstituted $C_1$-$C_{12}$, preferably $C_1$-$C_{10}$ monovalent hydrocarbon group, preferably exclusive of an aliphatic unsaturated group, a is as defined above, d is an integer of 0 to 3, e and f each are 0 or 1, d to f are selected such that the organo(poly)siloxane may have a viscosity in the above range.

In formulae (7) and (8), examples of $R^6$ to $R^{10}$ are as exemplified above for the silicon-bonded organic group. Among these, alkyl, cycloalkyl, aryl, aralkyl and haloalkyl groups are preferred, with methyl, phenyl and trifluoropropyl being more preferred.

As component (C), those compounds of formulae (7) and (8) wherein d, e and f each are 0 are preferred. Especially, (acryloxyalkyl)-pentaorganodisiloxanes corresponding to formula (7) wherein d=0 are preferred.

The amount of component (C) blended is 1 to 40% by weight, preferably 5 to 30% by weight, more preferably 10 to 25% by weight based on the total weight of components (A) to (C), specifically 1 to 40 parts by weight, preferably 5 to 30 parts by weight, more preferably 10 to 25 parts by weight per 100 parts by weight of components (A) to (C) combined. If the amount of component (C) is too small, not only the sensitizer function may become weak, but also the composition may undergo a noticeable increase of viscosity, detracting from workability. If the amount of component (C) is too much, the cured product may not be endowed with sufficient elasticity and hence, with desired bonding force or tack.

The amount of component (C) blended is desirably 1 to 70 parts by weight, more desirably 20 to 50 parts by weight per 100 parts by weight of components (A) and (B) combined.

[Component (D)]

Component (D) is a photo-initiator which is optional or a component to be blended if necessary. It may be selected from those initiators which are used in prior art UV-curable organopolysiloxane compositions. Examples include acetophenone, propiophenone, benzophenone, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 2,2'-diethoxyacetophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxyketal, 2-chlorothioxanthone, diethylacetophenone, 1-hydroxycyclohexyl phenyl ketone, 2-methyl-1-[4-(methylthio)phenyl]-2-morpholin-1-one, 2-benzyl-2-dimethylamino-1-(4-morpholinophenyl)butanone, 1-[4-(2-hydroxyethoxy)phenyl]-2-methyl-1-propan-1-one, 2,2-dimethoxy- 2-phenylacetophenone, 2-hydroxy-2-methyl-1-phenylpropan-1-one, and cyclohexyl phenyl ketone.

When used, the amount of component (D) blended is about 0.01 to 10% by weight, preferably about 0.05 to 8% by weight, more preferably about 0.1 to 5% by weight based on the total weight of the composition, specifically the total weight of components (A) to (D). If the amount of component (D) is too small, its addition effect may not be exerted. If the amount of component (D) is too much, the influence of decomposition residues of component (D) becomes stronger whereby the physical properties of the cured product may be degraded. Accordingly, the amount of component (D) blended is 0.01 to 15 parts by weight, preferably 0.05 to 10 parts by weight, more preferably 0.1 to 6 parts by weight per 100 parts by weight of components (A) to (C) combined.

Besides the foregoing components (A) to (D), other optional components may be added to the inventive composition as long as the benefits of the invention are not compromised. Suitable components include silica-base fillers (not inhibiting UV cure reaction) such as fumed silica, extenders such as silicone rubber powder and calcium carbonate, tackifiers (contributing to an improvement in adhesion or pressure-sensitive adhesion) such as alkoxyorganosilanes, heat resistant additives, and flame retardants.

The inventive composition may be prepared by metering components (A) to (D) and other optional components and mixing them uniformly.

The inventive composition is cured by resorting to UV exposure. Effective UV is of wavelength 250 to 450 nm, especially 250 to 380 nm, and the exposure dose is preferably 1,000 to 10,000 mJ/cm$^2$, especially 2,000 to 5,000 mJ/cm$^2$. The curing temperature may be room temperature, typically 25° C.±10° C.

A cured product (i.e., cured silicone having a pressure-sensitive adhesive surface, or silicone PSA) obtained from curing of the inventive composition by UV exposure is characterized by softness and a low rubber hardness as compared with prior art PSA compositions. That is, the cured product of the inventive UV curable silicone PSA composition preferably has a storage elastic modulus of up to 1.0 MPa, especially up to 0.5 MPa as measured at 25° C. by a viscoelasticity meter such as rheometer. Notably, the lower limit of storage elastic modulus at 25° C. is preferably at least 0.01 MPa, more preferably at least 0.02 MPa, though not critical.

Also, a PSA article may be obtained by coating the inventive UV curable silicone PSA composition to any of various substrates and curing the coating with UV.

The substrate is selected from plastic films and glass. Suitable plastic films include polyethylene film, polypropylene film, polyester film, polyimide film, polyvinyl chloride film, polyvinylidene chloride film, polyvinyl alcohol film, polycarbonate film, polystyrene film, ethylene-vinyl acetate copolymer film, ethylene-vinyl alcohol copolymer film, and triacetylcellulose film. The glass is not particularly limited with respect to thickness and type, and even chemically strengthened glass is acceptable. The substrate is not limited to the foregoing examples.

Also useful are those substrates which have been subjected to primer treatment or plasma treatment for improving the adhesion between the substrate and the PSA layer.

The coating means or method may be selected as appropriate from well-known coating means or methods such as a comma coater, lip coater, roll coater, die coater, knife coater, blade coater, rod coater, kiss coater, gravure coater, screen printing, dipping and casting methods.

Since the UV curable silicone PSA composition is of solventless type, a cured product thereof can also be prepared by potting. In case bubbles are entrapped in the potting step of pouring the composition into a container, the bubbles can be removed under reduced pressure. If it is desired to take out the cured product from the container after curing, preferably the container is treated with a parting agent before potting of the composition. For example, fluorine and silicone base parting agents may be used.

The UV curable silicone PSA composition is generally used as such. Where the composition must be improved in use conditions because of awkward handling or other inconvenience, it is acceptable to add an organic solvent to the composition prior to use as long as the desired properties are not compromised.

EXAMPLES

Examples and Comparative Examples are given below for further illustrating the invention although the invention is not limited thereto. In Examples, parts are by weight. Me stands for methyl, Ph for phenyl, and tert-Bu for tert-butyl. The viscosity is as measured at 25° C. by a rotational viscometer.

Component (A)

(A-1) A 60 wt % toluene solution of an organopolysiloxane resin of three-dimensional network structure consisting of Me$_3$SiO$_{1/2}$ units and SiO$_2$ units in a molar ratio (Me$_3$SiO$_{1/2}$ units)/(SiO$_2$ units) of 1.15, viscosity 10 mPa·s.

Component (B)

(B-1) A linear diphenylsiloxane-dimethylsiloxane copolymer having a backbone consisting of repeating diphenylsiloxane units and dimethylsiloxane units wherein the diphenylsiloxane units and dimethylsiloxane units are randomly arranged in the backbone, and containing four acryloxyethyloxy groups in the molecule at both ends of the molecular chain (i.e., two groups at each molecular chain end), as represented by the following formula (10), viscosity 3,000 mPa·s.

[Chem. 20]

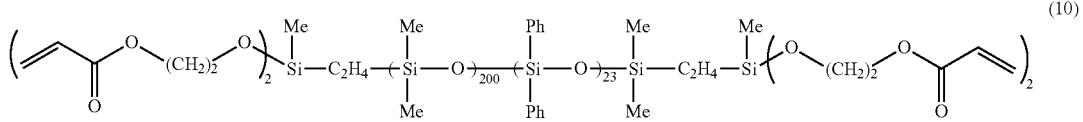

(10)

(B-2) A linear dimethylpolysiloxane having a backbone consisting of repeating dimethylsiloxane units and containing two acryloxymethyl groups in the molecule at both ends of the molecular chain (i.e., one group at each molecular chain end), as represented by the following formula (11), viscosity 100 mPa·s.

[Chem. 21]

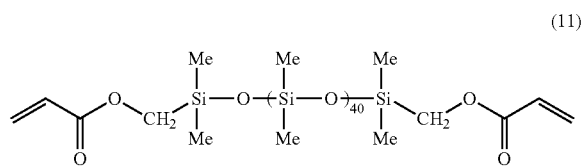
(11)

(B-3) A linear dimethylpolysiloxane having a backbone consisting of repeating dimethylsiloxane units and containing per molecule one acryloxyethyloxy-dimethylsilylethyl group and one tert-butyl group at both ends of the molecular chain, as represented by the following formula (12), viscosity 80 mPa·s.

[Chem. 22]

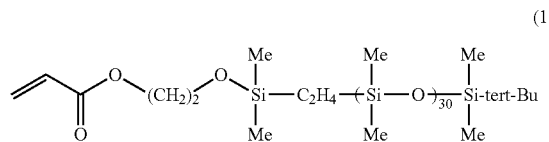
(12)

Component (C)

(C-1) (acryloxypropyl)-pentamethyldisiloxane represented by the following formula (13), viscosity 2 mPa·s.

[Chem. 23]

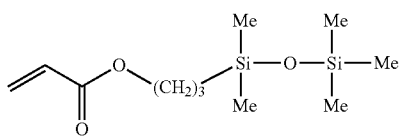
(13)

(C-2) 3-(acryloxypropyl)-1,1,1,3,5,5,5-heptamethyltrisiloxane represented by the following formula (14), viscosity 6 mPa·s.

[Chem. 24]

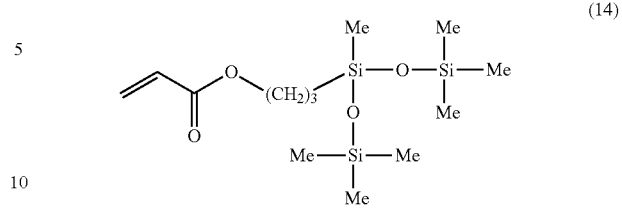
(14)

(C-3) 3-acryloxypropyl-methyldimethoxysilane (KBM-5102 by Shin-Etsu Chemical Co., Ltd.)
(C-4) 3-acryloxypropyl-trimethoxysilane (KBM-5103 by Shin-Etsu Chemical Co., Ltd.)
Component (D)
(D-1) Darocur 1173 by BASF Japan Examples 1 to 3 and Comparative Examples 1 to 3

Silicone PSA compositions S1 to S6 were prepared by blending components (A) to (D) in accordance with the formulation in Table 1 and distilling off toluene at 100° C. in vacuum. The silicone PSA compositions were cured by exposure to UV of wavelength 365 nm from an Eye UV electronic control instrument (model: UBX0601-01, Eye Graphics Co., Ltd.) at room temperature (25° C.) in air atmosphere such that the exposure dose of UV light was 2,000 mJ/cm$^2$.

Notably, the amount of component (A) shown in Table 1 is the net amount (pbw) of solids with the solvent removed.

The silicone PSA compositions and cured products thus obtained were evaluated with respect to the following items.
[Measurement of Storage Elastic Modulus]

The cured product of the silicone PSA composition was measured for storage elastic modulus by a viscoelasticity analyzer ARES-G2 (TA Instruments) under measurement conditions: frequency 1.0 Hz, oscillation angle γ 4.0%, and temperature 25±0.5° C. The results are shown in Table 1.
[Measurement of Pressure-Sensitive Adhesion]

Each of the silicone PSA compositions S1 to S6 was coated onto a support (sheet-like substrate) in the form of polyethylene terephthalate (PET) resin film so as to give a dry thickness of around 400 μm after curing, and cured by irradiating UV light of wavelength 365 nm in a dose of 2,000 mJ/cm$^2$, whereby a PSA sheet was obtained. The PSA sheet was attached to a PET resin film of 25 mm wide, pressed by moving a pressing roller of 2 kg once back and forth, and allowed to stand for 24 hours in a 23° C. atmosphere, after which a 180° peeling force (bonding force) was measured at a pulling rate of 0.3 m/min. The test piece was also evaluated for breaking mode (CF: cohesive failure, AF: adhesive failure (interfacial peeling)). The results are also shown in Table 1.

TABLE 1

|  |  | Example | | | Comparative Example | | |
|---|---|---|---|---|---|---|---|
|  |  | 1 | 2 | 3 | 1 | 2 | 3 |
| Silicone PSA composition |  | S1 | S2 | S3 | S4 | S5 | S6 |
| Amount (pbw) | (A-1) | 60 | 60 | 50 | 60 | 60 | 50 |
|  | (B-1) | 20 | 20 | 25 | 20 | 20 | — |
|  | (B-2) | — | — | — | — | — | 15 |
|  | (B-3) | — | — | — | — | — | 35 |
|  | (C-1) | 20 | — | 25 | — | — | — |

TABLE 1-continued

|  |  | Example | | | Comparative Example | | |
| --- | --- | --- | --- | --- | --- | --- | --- |
|  |  | 1 | 2 | 3 | 1 | 2 | 3 |
|  | (C-2) | — | 20 | — | — | — | — |
|  | (C-3) | — | — | — | 20 | — | — |
|  | (C-4) | — | — | — | — | 20 | — |
|  | (D-1) | 2.0 | 2.0 | 2.0 | 2.0 | 2.0 | 2.0 |
| Storage elastic modulus (MPa) |  | 0.08 | 0.3 | 0.05 | 2.0 | 12 | 0.07 |
| Pressure-sensitive adhesion | Bonding force (to PET, N/25 mm) | 15 | 5.6 | 5.8 | 17 | 24 | 0.3 |
|  | Breaking mode | CF | CF | CF | AF | AF | AF |

As seen from the results in Table 1, Examples 1 to 3 show a high bonding force to PET despite a relatively low storage modulus, demonstrating satisfactory pressure-sensitive adhesion. Because of a high storage modulus after curing, Comparative Examples 1 and 2 have a bonding force to PET, but show the breaking mode of interfacial peeling. Comparative Example 3 shows not only a low bonding force to PET, but also the breaking mode of interfacial peeling.

The invention claimed is:

1. A UV-curable silicone pressure-sensitive adhesive composition comprising (A) 30 to 70 parts by weight of an organopolysiloxane resin (A) comprising (a) $R^1_3SiO_{1/2}$ units wherein $R^1$ is a substituted or unsubstituted $C_1$-$C_{10}$ monovalent hydrocarbon group and (b) $SiO_{4/2}$ units, wherein a molar ratio of units (a) to units (b) is from 0.6:1 to 1.2:1, (B) 1 to 40 parts by weight of a linear or branched organopolysiloxane (B) having a backbone composed of repeating diorganosiloxane units and containing an average of 1 to 4 monovalent substituent groups per molecule, the monovalent substituent groups having the general formula (4):

General Formula (4)

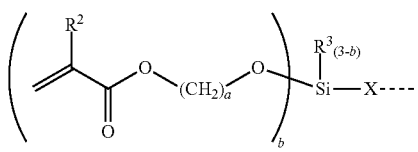

(4)

wherein $R^2$ is hydrogen or methyl, $R^3$ is independently a substituted or unsubstituted $C_1$-$C_{10}$ monovalent hydrocarbon group, X is a $C_2$-$C_6$ alkylene group, a is an integer of 1 to 3, b is 1 or 2, and the broken line designates a valence bond to a silicon atom, the organopolysiloxane (B) having a viscosity at 25° C. of from more than 50 mPa·s to 500,000 mPa·s, and (C) 1 to 40 parts by weight of a reactive diluent, the reactive diluent being an organopolysiloxane (C) containing one monovalent group having the general formula (3):

General Formula (3)

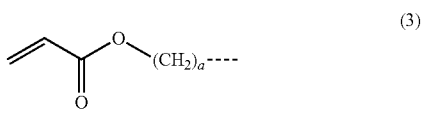

(3)

wherein a is as defined above and the broken line designates a valence bond to a silicon atom at an end or on a side chain of the organopolysiloxane (C) molecular chain, the organopolysiloxane (C) having a viscosity at 25° C. of 1 to 50 mPa·s, with the proviso that the total amount of organopolysiloxane resin (A), organopolysiloxane (B), and organopolysiloxane (C) is 100 parts by weight.

2. The silicone pressure-sensitive adhesive composition of claim 1 wherein the organopolysiloxane (B) contains monovalent substituent groups having the general formula (4) at both ends of the molecular chain.

3. The silicone pressure-sensitive adhesive composition of claim 1 or 2 wherein the backbone of the organopolysiloxane (B) consists of diphenylsiloxane repeating units having the general formula (6):

General Formula (6)

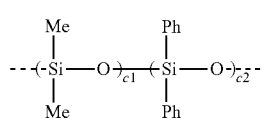

(6)

wherein Me is methyl, Ph is phenyl, c1 and c2 are integers in the range: c1≥0, c2≥1, and c1+c2=c, c is such a number that the organopolysiloxane (B) has a viscosity at 25° C. of from more than 50 mPa·s to 500,000 mPa·s, and the broken line designates a valence bond.

4. The silicone pressure-sensitive adhesive composition of claim 1 wherein the organopolysiloxane (C) has the general formula (7) or (8):

General Formula (7)

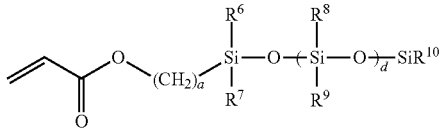

General Formula (8)

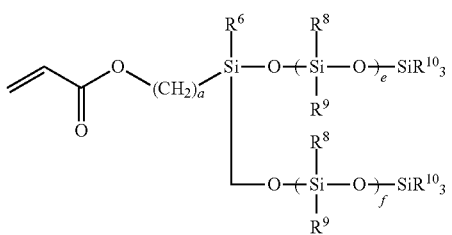

wherein $R^6$ to $R^{10}$ each are a substituted or unsubstituted $C_1$-$C_{12}$ monovalent hydrocarbon group, a is an integer of 1 to 3, the organo(poly)siloxane has a viscosity at 25° C. of 1 to 50 mPa·s, d is an integer of 0 to 3, e and f are 0 or 1.

5. The silicone pressure-sensitive adhesive composition of claim 1, further comprising (D) 0.01 to 15 parts by weight of a photo-initiator per 100 parts by weight of the organopolysiloxane resin (A), the organopolysiloxane (B), and the organopolysiloxane (C) combined.

6. The silicone pressure-sensitive adhesive composition of claim 1 which forms a silicone pressure-sensitive adhesive having a storage elastic modulus of up to 1.0 MPa after curing, wherein the storage elastic modulus is measured at 1.0 Hz, an oscillation angle γ 4.0%, and a temperature of 25±0.5° C.

7. A silicone pressure-sensitive adhesive film comprising a substrate and a pressure-sensitive adhesive layer formed on at least one surface of the substrate, said pressure-sensitive adhesive layer being a UV-cured product of the silicone pressure-sensitive adhesive composition of claim 1.

8. The silicone pressure-sensitive adhesive film of claim 7 wherein the substrate is a plastic film.

* * * * *